(12) United States Patent
Nishitani et al.

(10) Patent No.: US 7,366,669 B2
(45) Date of Patent: Apr. 29, 2008

(54) ACOUSTIC MODEL CREATION METHOD AS WELL AS ACOUSTIC MODEL CREATION APPARATUS AND SPEECH RECOGNITION APPARATUS

(75) Inventors: Masanobu Nishitani, Shiojiri (JP); Yasunaga Miyazawa, Okaya (JP); Hiroshi Matsumoto, Nagano (JP); Kazumasa Yamamoto, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 817 days.

(21) Appl. No.: 10/793,859

(22) Filed: Mar. 8, 2004

(65) Prior Publication Data

US 2004/0236577 A1 Nov. 25, 2004

(30) Foreign Application Priority Data

Mar. 14, 2003 (JP) .............................. 2003-070543

(51) Int. Cl.
  *G10L 15/14* (2006.01)
(52) U.S. Cl. ...................................................... 704/256
(58) Field of Classification Search ................ 704/256
  See application file for complete search history.

(56) References Cited

U.S. PATENT DOCUMENTS

| | | | |
|---|---|---|---|
| 5,502,790 A | | 3/1996 | Yi |
| 5,956,676 A | * | 9/1999 | Shinoda ...................... 704/244 |
| 6,711,541 B1 | * | 3/2004 | Kuhn et al. ................. 704/242 |
| 2006/0074664 A1 | * | 4/2006 | Lam et al. .................. 704/255 |

FOREIGN PATENT DOCUMENTS

JP A 8-123477 5/1996

OTHER PUBLICATIONS

Kazumasa Yamamoto, Taro Ikeda, Hiroshi Matsumoto, Masanobu Nishitani, and Yasunaga Miyazawa: "An Investigation of Compact and High Performance Syllable Models", Papers of Fall Meeting of the Acoustic Society of Japan in 2002, 1-9-22 (w/English-language translation).

Kazumasa Yamamoto, Taro Ikeda, Hiroshi Matsumoto, Masanobu Nishitani, and Yasunaga Miyazawa: "Compact Acoustic Models Using Syllables for Japanese LVCSR".

* cited by examiner

*Primary Examiner*—Tālivaldis Ivars Šmits
*Assistant Examiner*—Josiah Hernandez
(74) *Attorney, Agent, or Firm*—Oliff & Berridge, PLC

(57) ABSTRACT

To provide an acoustic model which can absorb the fluctuation of a phonemic environment in an interval longer than a syllable, with the number of parameters of the acoustic model suppressed to be small, a phoneme-connected syllable HMM/syllable-connected HMM set is generated in such a way that a phoneme-connected syllable HMM set corresponding to individual syllables is generated by combining phoneme HMMs. A preliminary experiment is conducted using the phoneme-connected syllable HMM set and training speech data. Any misrecognized syllable and the preceding syllable of the misrecognized syllable are checked using results of a preliminary experiment syllable label data. The combination between a correct answer syllable for the misrecognized syllable and the preceding syllable of the misrecognized syllable is extracted as a syllable connection. A syllable-connected HMM corresponding to this syllable connection is added into the phoneme-connected syllable HMM set. The resulting phoneme-connected syllable HMM set is trained using the training speech data and the syllable label data.

14 Claims, 9 Drawing Sheets

| SYLLABLE CONNECTION | NUMBER OF TIMES OF MISRECOGNITION |
|---|---|
| ku-ra | 134 |
| ku-ru | 189 |
| ku-re | 75 |
| ku-ro | 165 |
| ro-i | 286 |
| i-ku | 241 |
| ⋮ | ⋮ |

| SYLLABLE CONNECTION | NUMBER OF TIMES OF OCCURRENCE |
|---|---|
| ku-ra | 185 |
| ku-ru | 234 |
| ku-ro | 215 |
| ro-i | 305 |
| i-ku | 276 |
| ⋮ | ⋮ |

FIG. 6

| SYLLABLE CONNECTION | NUMBER OF TIMES OF MISRECOGNITION |
|---|---|
| ro-i | 286 |
| i-ku | 241 |
| ku-ru | 189 |
| ku-ro | 165 |
| ⋮ | ⋮ |

(a)　ku　ro　i　ku　ru　ma
　　　↓ /ro-i/ WHOSE NUMBER OF TIMES OF
　　　　 MISRECOGNITION IS LARGEST IS APPLIED.
(b)　ku　ro-i　ku　ru　ma
　　　↓ SINCE /i-ku/ CANNOT BE APPLIED,
　　　　 NEXT /ku-ru/ IS APPLIED.
(c)　ku　ro-i　ku-ru　ma
　　　↓ SINCE /ku-ro/ CANNOT BE APPLIED,
　　　　 PROCESSING IS ENDED HERE.
(d)　ku　ro-i　ku-ru　ma　⋯ CORRECT RESULT

FIG. 9

ACOUSTIC MODEL CREATION METHOD AS WELL AS ACOUSTIC MODEL CREATION APPARATUS AND SPEECH RECOGNITION APPARATUS

BACKGROUND OF THE INVENTION

1. Field of Invention

The present invention relates to an acoustic model creation method as well as an acoustic model creation apparatus which creates a Continuous Mixture Density HMM (Hidden Markov Model) as an acoustic model, and a speech recognition apparatus which employs the acoustic model created by the method or apparatus.

2. Description of Related Art

In speech recognition, there has been generally used a method wherein an HMM in phoneme or syllable units is used as an acoustic model, the phoneme HMMs or syllable HMMs are connected, and a speech in units of words or clauses is recognized.

With the related-art phoneme HMM or syllable HMM, however, the fluctuation of a phonemic environment in an interval longer than a syllable is difficult to be expressed, resulting in the problem that a speech recognition rate is impaired.

An undefined-length acoustic model which makes the unit of the HMM longer than a phoneme and expresses several phonemes in order to address the problem, has been known as stated in JP-A-8-123477 entitled "Undefined-length Acoustic Model Creation Apparatus and Speech Recognition Apparatus".

SUMMARY OF THE INVENTION

The undefined-length acoustic model disclosed in JP-A-8-123477 has a problem that, since it determines the unit of the acoustic model in training fashion in adaptation to the utterance characteristic of a certain specified speaker, it is difficult to create an optimal acoustic model for many and unspecified speakers, so the application thereof to unspecified-speaker speech recognition is difficult.

When various undefined-length acoustic models are prepared, the consequent increase in the number of undefined-length acoustic models involves an increase in the number of HMM parameters. Further, the software scale of a speech recognition decoder unit is enlarged because of, for example, a unit in a phonemic direction (the number of phonemes to be connected) being of undefined length, and that speech recognition is implemented by connecting the undefined-length acoustic models. As a result, the application of the increased undefined-length acoustic models is unsuited to equipment which is constructed of hardware of small size, low price and low dissipation power.

The present invention therefore addresses these problems by providing an acoustic model creation method, as well as an acoustic model creation apparatus, which create an acoustic model that can absorb the fluctuation of a phonemic environment in an interval longer than a syllable, with the number of parameters of the acoustic model suppressed to be small and also providing a speech recognition apparatus which can be applied to an inexpensive system with its processibility, its memory capacity and the like hardware resources severely restricted.

In order to achieve the above, an acoustic model creation method of an aspect of the present invention to create a syllable HMM which is an acoustic model is characterized by generating a phoneme HMM set which include phoneme HMMs corresponding to individual phonemes, connecting the phoneme HMMs of the phoneme HMM set so as to generate an initial phoneme-connected syllable HMM set which includes initial phoneme-connected syllable HMMs corresponding to individual syllables, and training the initial phoneme-connected syllable HMM set, thereby generating a phoneme-connected syllable HMM set being the acoustic model.

In such an acoustic model creation method, a preliminary experiment is conducted for the phoneme-connected syllable HMM set by using training speech data. Any misrecognized syllable and a syllable connected to the misrecognized syllable are checked using results of the preliminary experiment and syllable label data prepared in correspondence with the training speech data. A combination between a correct answer syllable for the misrecognized syllable and a syllable connected to the misrecognized syllable is extracted as a syllable connection. A syllable-connected HMM corresponding to the syllable connection is added into the phoneme-connected syllable HMM set so as to generate an initial phoneme-connected syllable HMM/syllable-connected HMM set. Then the initial phoneme-connected syllable HMM/syllable-connected HMM set is trained using the training speech data and the syllable label data, thereby generating a phoneme-connected syllable HMM/syllable-connected HMM set being the acoustic model.

In the acoustic model creation method, the number of times of misrecognition of such syllable connections in the preliminary experiment results are counted, and a syllable-connected HMM corresponding to any syllable connection whose number of times of misrecognition is at least a preset number, among the syllable connections extracted using the preliminary experiment results, is made a candidate for addition into the phoneme-connected syllable HMM set.

In the acoustic model creation method, it is preferable that the number of times which such syllable connections occur in syllable label data corresponding to the training speech data should be counted in addition to the numbers of times of misrecognition, and that a syllable-connected HMM corresponding to any syllable connections whose number of times of occurrence in syllable label data corresponding to the training speech data is at most a preset number, among the syllable connections whose numbers of times of misrecognition are at least the preset number, should be excluded as a candidate for addition into the phoneme-connected syllable HMM set.

In the acoustic model creation method, the syllable label data is corrected using any syllable connection which corresponds to the syllable-connected HMM made a candidate for addition into the phoneme-connected syllable HMM set, and subject to a plurality of syllable connections repeatedly applicable in a case where the syllable connection corresponding to the syllable-connected HMM made a candidate for addition into the phoneme-connected syllable HMM set is applied to the syllable label data, the syllable connection whose number of times of misrecognition is larger is preferentially applied so as to correct the corresponding syllable label data.

In the acoustic model creation method, it is preferable that, in a case where any common phoneme HMM is used in the training of initial phoneme-connected syllable HMMs as proceeded in generating the phoneme-connected syllable HMM set and in the training of initial phoneme-connected syllable HMMs/syllable-connected HMMs as proceeded in generating the phoneme-connected syllable HMM/syllable-connected HMM set, Gaussian distributions are tied in respective states of the common phoneme HMM.

In the acoustic model creation method, the syllable connected to any misrecognized syllable is a preceding syllable of the misrecognized syllable, and a combination between the preceding syllable and a correct answer syllable for the misrecognized syllable is extracted as the syllable connection.

In the acoustic model creation method, it is possible that distribution number optimization processing employing a Minimum Description Length criterion is executed for the phoneme-connected syllable HMM set, thereby generating a phoneme-connected syllable HMM set whose distribution numbers are optimized, and which is used in subsequent processing.

An acoustic model creation apparatus of an aspect of the present invention to create a syllable HMM which is an acoustic model includes an initial phoneme-connected syllable HMM set generation device to combine phoneme HMMs trained in correspondence with individual phonemes, so as to generate an initial phoneme-connected syllable HMM set which includes initial phoneme-connected syllable HMMs corresponding to individual syllables; and a HMM retraining device to retrain the initial phoneme-connected syllable HMM set so as to generate a phoneme-connected syllable HMM set being the acoustic model.

Such an acoustic model creation apparatus may include a preliminary experiment device to conduct a preliminary experiment which uses training speech data, for a phoneme-connected syllable HMM set; a misrecognized-syllabic-part extraction device to check any misrecognized syllable and a syllable connected to the misrecognized syllable by using results of the preliminary experiment obtained by said preliminary experiment device and syllable label data prepared in correspondence with the training speech data, and to extract as a syllable connection, a combination between a correct answer syllable for the misrecognized syllable and a syllable connected to the misrecognized syllable; an initial phoneme-connected syllable HMM/syllable-connected HMM set generation device to add a syllable-connected HMM which corresponds to the syllable connection extracted by said misrecognized-syllabic-part extraction device, into the phoneme-connected syllable HMM set, thereby generating an initial phoneme-connected syllable HMM/syllable-connected HMM set; and an HMM retraining device to retrain the initial phoneme-connected syllable HMM/syllable-connected HMM set generated by said initial phoneme-connected syllable HMM/syllable-connected HMM set generation device, by using the training speech data and the syllable label data, thereby generating a phoneme-connected syllable HMM/syllable-connected HMM set being the acoustic model.

In the acoustic model creation apparatus, the misrecognized-syllabic-part extraction device counts the numbers of times of misrecognition of the syllable connections in the preliminary experiment results, and a syllable-connected HMM corresponding to any syllable connection whose number of times of misrecognition is at least a preset number, among the syllable connections extracted using the preliminary experiment results, is made a candidate for addition into the phoneme-connected syllable HMM set.

In the acoustic model creation apparatus, the numbers of times which such syllable connections occur in syllable label data corresponding to the training speech data may be counted in addition to the numbers of times of misrecognition, and that a syllable-connected HMM corresponding to any syllable connection whose number of times of occurrence in syllable label data corresponding to the training speech data is at most a preset number, among the syllable connections whose numbers of times of misrecognition are at least the preset number, should be excluded as a candidate for addition into the phoneme-connected syllable HMM set.

In the acoustic model creation apparatus, a syllable label data correction device to correct the syllable label data is provided, the syllable label data correction device corrects the syllable label data by using any syllable connection which corresponds to the syllable-connected HMM made a candidate for addition into the phoneme-connected syllable HMM set, and subject to a plurality of syllable connections repeatedly applicable in a case where the syllable connection corresponding to the syllable-connected HMM made a candidate for addition into the phoneme-connected syllable HMM set is applied to the syllable label data, the syllable connection whose number of times of misrecognition is larger is preferentially applied so as to correct the corresponding syllable label data.

In the acoustic model creation apparatus, in a case where any common phoneme HMM is used in the training of initial phoneme-connected syllable HMMs as proceeded in generating the phoneme-connected syllable HMM set and in the training of initial phoneme-connected syllable HMMs/syllable-connected HMMs as proceeded in generating the phoneme-connected syllable HMM/syllable-connected HMM set, Gaussian distributions may be tied in respective states of the common phoneme HMM.

In the acoustic model creation apparatus, the syllable connected to any misrecognized syllable is a preceding syllable of the misrecognized syllable, and a combination between the preceding syllable and a correct answer syllable for the misrecognized syllable is extracted as the syllable connection.

In the acoustic model creation apparatus, it is also possible that a distribution number optimization device to subject the phoneme-connected syllable HMM set to distribution number optimization processing using a Minimum Description Length criterion is provided and a phoneme-connected syllable HMM set whose distribution numbers are optimized is generated by the distribution number optimization device and is used in subsequent processing.

A speech recognition apparatus of an aspect of the present invention to recognize input speech by using an HMM which is an acoustic model, for feature data obtained by subjecting the input speech to a feature analysis, is characterized in that any acoustic model created by any acoustic model, creation method or acoustic model creation apparatus described above, is used as the HMM being the acoustic model.

In this manner, according to an aspect of the present invention, it is permitted to generate phoneme-connected syllable HMMs by connecting phoneme HMMs, and to use the phoneme-connected syllable HMMs as syllable HMMs corresponding to individual syllables. Owing to such generation of the phoneme-connected syllable HMMs (syllable HMMs) by connecting the phoneme HMMs, the phoneme-connected syllable HMMs can be more efficiently trained with a small number of training speech data, and they can therefore be made to have higher performance.

A phoneme-connected syllable HMM/syllable-connected HMM set being an acoustic model is generated in such a way that a preliminary experiment is conducted using phoneme-connected syllable HMMs which are formed of the combinations of the phoneme HMMs. In the results of the preliminary experiment and as to any syllabic part liable to misrecognition, the combination between a correct answer syllable for the misrecognized syllable and a syllable connected to the misrecognized syllable is extracted as a syllable connection. A syllable-connected HMM corresponding to the syllable connection is added into the phoneme-connected syllable HMM set so as to generate an initial phoneme-connected syllable HMM/syllable-connected HMM set. Then the initial phoneme-connected syllable HMM/syllable-connected HMM set is trained. Therefore, the phoneme-connected syllable HMM/syllable-connected HMM set in which coarticulation is considered, not only within each syllable, but also between syllables can be generated, and a high recognition rate can be attained by using this phoneme-connected syllable HMM/syllable-connected HMM set as the acoustic model.

The numbers of times of misrecognition of syllable connections in the preliminary experiment results are counted, and any syllable-connected HMM corresponding to the syllable connection whose number of times of misrecognition, among the syllable connections extracted on the basis of the preliminary experiment results, is at least a preset number, is made a candidate for addition into the phoneme-connected syllable HMM set. Therefore, only syllable-connected HMMs which are effective in practical recognition can be efficiently extracted without indiscriminately increasing syllable-connected HMMs which are to be added to the phoneme-connected syllable HMMs.

Further, besides the number of times of misrecognition, the number of times which the syllable connection occurs in syllable label data corresponding to the training speech data is counted. Any syllable-connected HMM corresponding to the syllable connection whose number of times of occurrence, among such syllable connections whose numbers of times of misrecognition are at least the preset number, is at most a preset number is excluded from the candidates for addition into the phoneme-connected syllable HMM set. Therefore, the syllable-connected HMMs, which are effective for the practical recognition, can be extracted in a smaller number.

On condition that, in a case where syllable label data is corrected using any syllable connections corresponding to the syllable-connected HMM made a candidate for addition into the phoneme-connected syllable HMM set and where the syllable connection corresponding to the syllable-connected HMM made a candidate for addition into the phoneme-connected syllable HMM set is applied to the syllable label data, a plurality of syllable connections are repeatedly applicable. The syllable connection whose number of times of misrecognition is larger is preferentially applied, and the syllabic separation of the corresponding syllable label data is corrected. In this manner, the corrections of the syllable label data are made by preferentially applying the syllable connections whose numbers of times of misrecognition are larger. Therefore, a phoneme-connected syllable HMM/syllable-connected HMM set of higher accuracy can be generated by subjecting the syllable-connected HMMs (initial syllable-connected HMMs) to training which uses the training speech data and the corrected syllable label data.

On condition that, in the training of HMMs as proceeded in generating the phoneme-connected syllable HMM set and in the training of HMMs as proceeded in generating the phoneme-connected syllable HMM/syllable-connected HMM set, any common phoneme HMM is used, Gaussian distributions are tied in the respective states of the common phoneme HMM. Therefore, the problem of insufficient training data attributed to the longer unit of the recognition can be coped with, so that a recognition rate can be prevented from becoming lower.

A syllable connected to any misrecognized syllable is the preceding syllable of the misrecognized syllable, and the combination between this preceding syllable and a correct answer syllable for the misrecognized syllable is made the syllable connection. The combination may well be with the succeeding syllable of the misrecognized syllable. Since, however, the combination with the preceding syllable has produced a more favorable result by an experiment, a higher recognition rate will be attained in practical recognition when the syllable connection is the combination with the preceding syllable.

As distribution number optimization processing is executed for phoneme-connected syllable HMMs by a distribution number optimization device, the distribution numbers of the respective states of the individual phoneme-connected syllable HMMs after the distribution number optimization processing are optimized. Therefore, the number of parameters can be sharply decreased while a satisfactory recognition performance is ensured. Accordingly, curtailment in a memory capacity to be used and curtailment in an arithmetic amount are attained, operations with a CPU of low processibility are permitted, and lower dissipation power is attained, so that the application of an aspect of the present invention to a system requiring a low price becomes possible.

The speech recognition apparatus of an aspect of the present invention uses the phoneme-connected syllable HMM/syllable-connected HMM set created by the above acoustic model creation method of an aspect of the present invention. The phoneme-connected syllable HMM/syllable-connected HMM set has coarticulation considered, not only within each syllable, but also between syllables, so that a high recognition rate can be attained by using this phoneme-connected syllable HMM/syllable-connected HMM set as an acoustic model. Moreover, since syllable-connected HMMs are created for syllable connections liable to misrecognition, the scale of the acoustic model can be prevented from enlarging more than is necessary. Since the minimum necessary syllable-connected HMMs effective for recognition are owned, curtailment in an arithmetic amount and curtailment in a memory capacity to be used are permitted with a high recognition rate kept. Thereby permitting a raised processing speed is permitted as well as a lower price and lower dissipation power, so that the speech recognition apparatus becomes very useful as one which is installed on a small-sized and inexpensive system that is subject to serious restrictions to hardware resources.

BRIEF DESCRIPTION OF THE DRAWINGS

FIGS. 4A and 4B are schematics to explain a concrete example in which, in the acoustic model creation processing in FIG. 1, a preliminary experiment result and correct answer data (syllable label data) are compared, whereby the combination between a correct answer syllable for any misrecognized syllable and a syllable preceding it is extracted as a syllable connection;

FIG. 6 is a schematic showing examples of results obtained by counting the numbers of times which the syllable connections extracted by the processing in FIGS. 4A and 4B occur in all the syllable label data;

FIG. 7 is a schematic showing as an addition candidate syllable-connected HMM list, examples obtained in such a way that, among the syllable connections whose numbers of times of misrecognition are at least a preset number in the results in FIG. 5, the syllable connections whose numbers of times of occurrence in FIG. 6 are at most a preset number are excluded;

FIGS. 8A-8E are schematics to explain an example in which a plurality of syllable connections overlap when the syllable connections shown in FIG. 7 are applied to syllable label data;

FIGS. 9A-9D are schematics to explain an example in which the syllable label data is corrected for the example shown in FIGS. 8A-8E;

DETAILED DESCRIPTION OF PREFERRED EMBODIMENTS

Now, exemplary embodiments of the present invention will be described.

Figure 1:
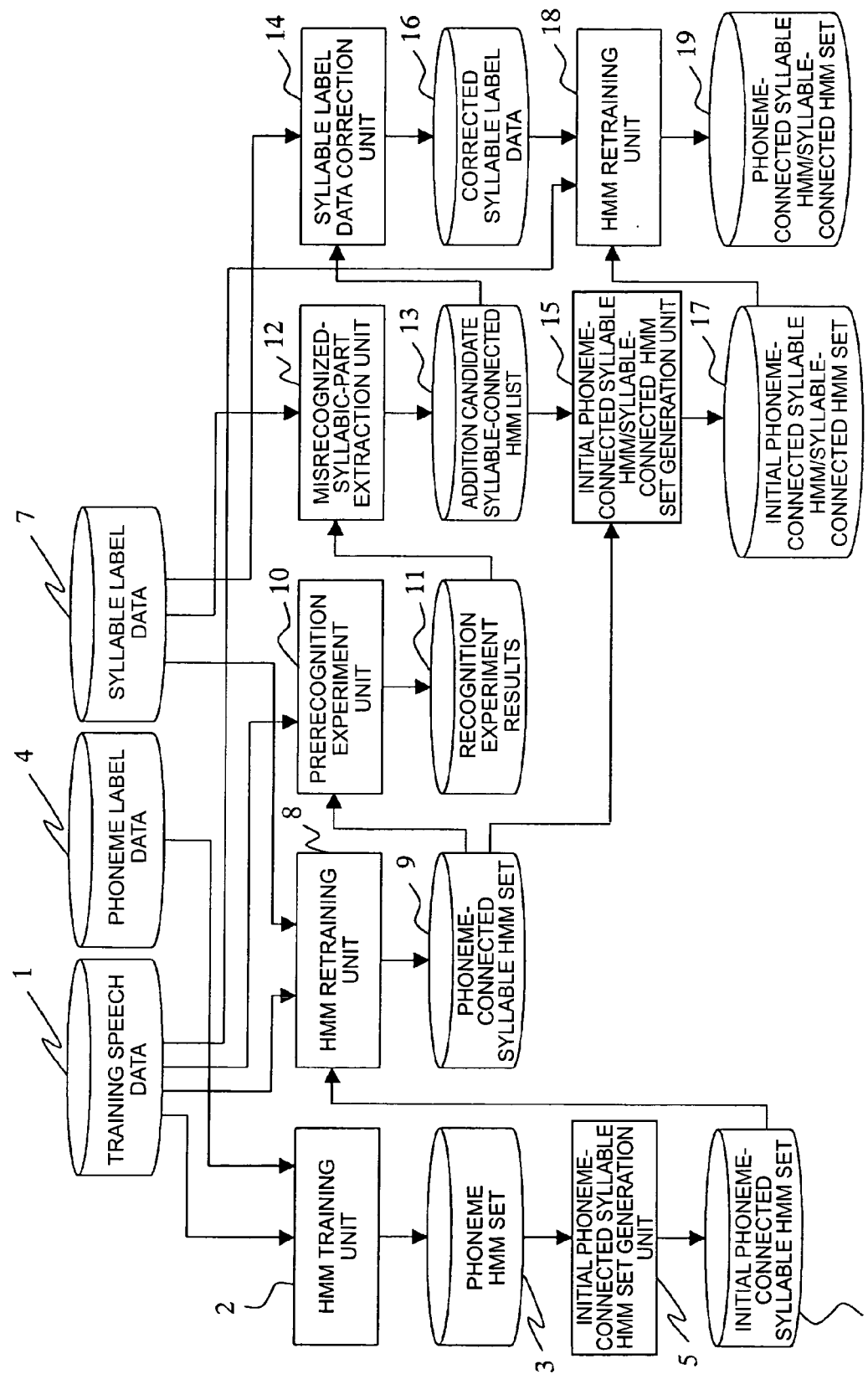
FIG. 1 is a chart to explain an exemplary embodiment of the acoustic model creation processing of the present invention.

FIG. 1 is a chart to explain the general flow of processing which elucidates an exemplary embodiment of the acoustic model creation method of an aspect of the present invention. The acoustic model creation method and acoustic model creation apparatus of an aspect of the present invention will be described in conjunction with this figure.

First, an HMM training unit 2 trains as to the parameters of individual phoneme HMMs on the basis of a maximum likelihood estimation method by using training speech data 1 and phoneme label data 4, whereby a phoneme HMM set 3 having any desired maximum distribution number (for example, a distribution number of 200) is created.

Figure 2:
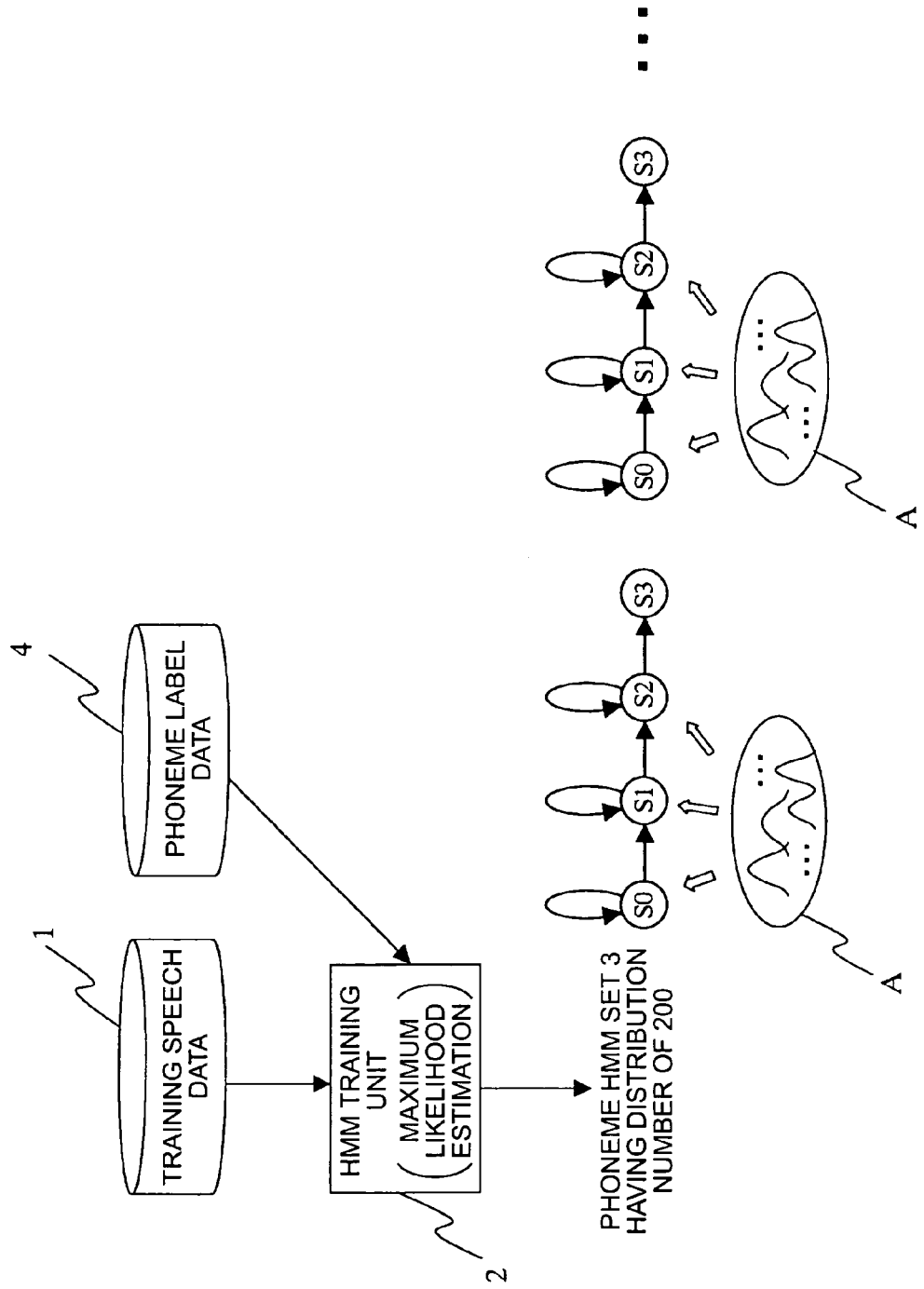
FIG. 2 is a schematic to explain phoneme HMM generation processing which is based on training a phoneme HMM set in the acoustic model creation processing shown in FIG. 1.

FIG. 2 is a schematic to explain the steps of procedure for creating such a phoneme HMM set. Referring to FIG. 2, in the HMM training unit 2, the phoneme HMMs corresponding to individual phonemes (here, assumed to be the 43 phonemes, such as phoneme /a/, phoneme /k/, . . . ) are trained on the basis of the maximum likelihood method by using the training speech data 1 and the phoneme label data 4. As a result, the phoneme HMM set 3 having the maximum distribution number, in this case, the distribution number of 200 is created. In this example, the phoneme HMMs corresponding to the individual phonemes are assumed to be constituted by three states S0, S1 and S2 each having a self-loop, and a final state S3 having no self-loop.

In FIG. 2, a Gaussian distribution within an elliptical frame A, which is depicted under the self-looped states S0, S1 and S2 of each phoneme HMM in the phoneme HMM set 3, shows a distribution example in each of these states. In the phoneme HMM set 3, any phoneme HMM has 200 distributions.

Next, referring back to FIG. 1, an initial phoneme-connected syllable HMM set generation unit 5 generates an initial phoneme-connected syllable HMM set 6 by using the phonemic HMM set 3 obtained by the training of the HMM training unit 2. The generation of the initial phoneme-connected syllable HMM set 6 will be described with reference to FIGS. 3A-3D.

The word "initial" here in the initial phoneme-connected syllable HMM set 6 signifies HMMs before being trained. Besides, the phoneme-connected syllable HMM signifies a syllable HMM which is generated by connecting two phoneme HMMs and is expected here as "phoneme-connected" syllable HMM.

Figure 3:
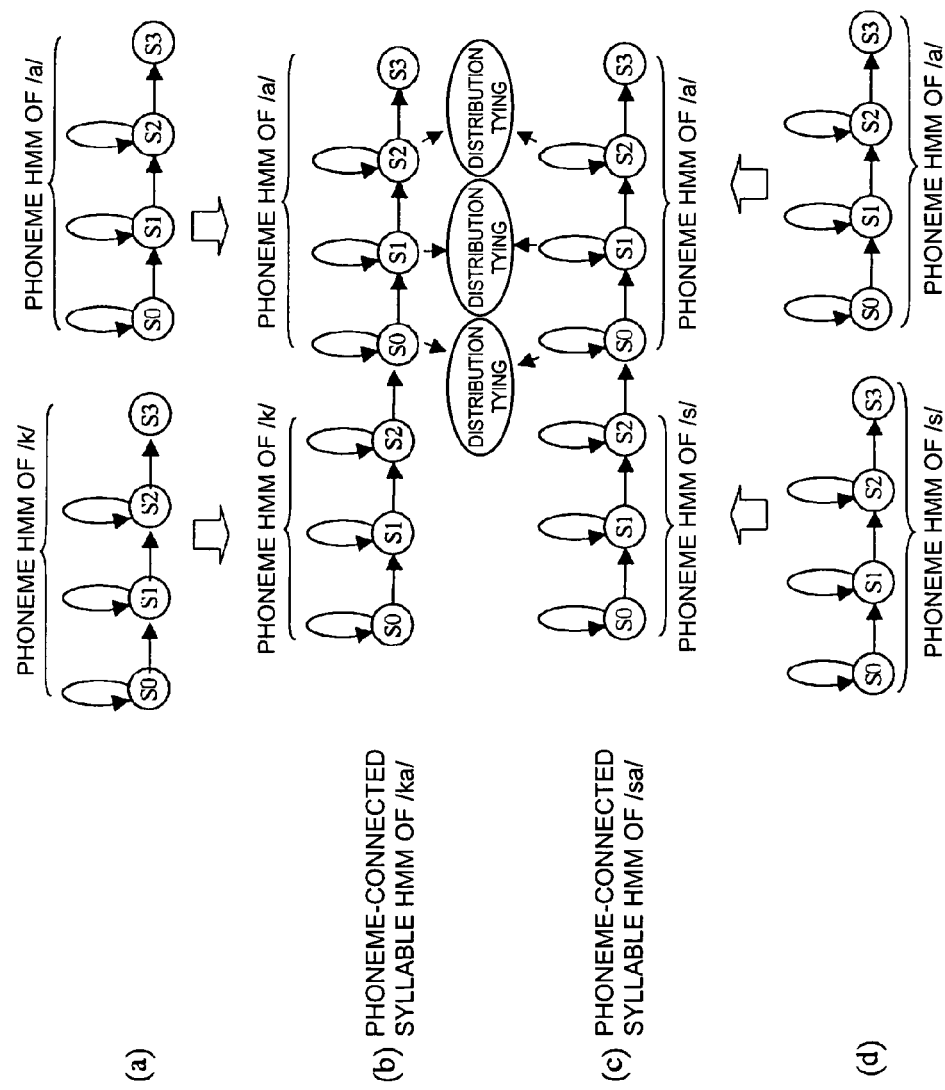
FIGS. 3A-3D are schematics to explain processing to generate an initial phoneme-connected syllable HMM set by using the phoneme HMM set generated in FIG. 2.

FIGS. 3A-3D show an example in which a phoneme HMM corresponding to a phoneme /k/ and a phoneme HMM corresponding to a phoneme /a/ as shown in FIG. 3A are connected, thereby generating a phoneme-connected syllable HMM corresponding to a syllable /ka/ as shown in FIG. 3B. Also shown is an example in which a phoneme HMM corresponding to a phoneme /s/ and a phoneme HMM corresponding to the phoneme /a/ as shown in FIG. 3D are connected, thereby generating a phoneme-connected syllable HMM corresponding to a syllable /sa/ as shown in FIG. 3C. The HMM set (initial phoneme-connected syllable HMM set 6) corresponding to all syllables (for example, 124 syllables) is generated by connecting the two phoneme HMMs in this manner.

In generating such an initial phoneme-connected syllable HMM set 6, the same phoneme HMM is sometimes shared. In that case, the respective states (S0, S1, S2) having self-loops of the pertinent phoneme HMM (in the example of FIGS. 3A-3D, the phoneme HMM corresponding to the phoneme /a/) share the parameter (as distribution tying). As to the individual phoneme-connected syllable HMMs of the initial phoneme-connected syllable HMM set 6, an HMM retraining unit 8 retrains on the basis of the maximum likelihood method by using the training speech data 1 and syllable label data 7, whereby a phoneme-connected syllable HMM set 9 is generated.

Phoneme-connected syllable HMMs corresponding to the individual syllables as obtained by the HMM retraining of the HMM retraining unit 8 are brought into distribution tying in the respective states of the same phoneme HMM. Therefore, among parameters such as an average value, variance and weight, in the respective states of the phoneme HMM, the weight changes to values corresponding to the respective phoneme-connected syllable HMMs. Accordingly, even the phoneme-connected syllable HMMs which correspond to, for example, each of the syllables /ka/ and /sa/ employing the same phoneme HMM corresponding to the phoneme /a/ become the phoneme-connected syllable HMMs in which coarticulation is considered.

The phoneme-connected syllable HMM set 9 generated by the above processing procedure, in itself, can be adopted as an acoustic model. This phoneme-connected syllable HMM set 9, which includes the phoneme-connected syllable HMMs generated by combining the phoneme HMMs, can train more efficiently with a smaller number of training speech data than in the related-art syllable HMM set, so that it can be made to have higher performance. Accordingly, the phoneme-connected syllable HMM set 9 attains a higher recognition rate than in speech recognition which uses the related-art syllable HMM set as an acoustic model. In this exemplary embodiment, processing to be discussed below is further executed by using the phoneme-connected syllable HMM set 9.

First, preliminary experiments are conducted using the individual phoneme-connected syllable HMMs which correspond to the respective syllables (for example, 124 syllables) of the phoneme-connected syllable HMM set 9. A preliminary experiment unit 10 shown in FIG. 1 conducts the preliminary experiments by using the training speech data 1, and the individual phoneme-connected syllable HMMs which exist in the phoneme-connected syllable HMM set 9.

The results of the recognition experiments conducted by the preliminary experiment unit 10 are saved as preliminary experiment results 11. The preliminary experiment results 11 are saved as, for example, the description of continuous syllable strings which are recognized results corresponding to the various training speech data.

Subsequently, misrecognized syllabic parts are extracted using the preliminary experiment results 11. A misrecognized-syllabic-part extraction unit 12 executes the extraction of the misrecognized syllabic parts by using the syllable label data 7 and the preliminary experiment results 11. The processing of the misrecognized-syllabic-part extraction will be described with reference to FIGS. 4A and 4B.

In the processing here, each preliminary experiment result 11 and correct answer data (the syllable label data 7) are compared by, for example, pattern matching to thereby identify any misrecognized syllabic part, and the combination between a correct answer syllable for the misrecognized syllable and a syllable connected to the misrecognized syllable is extracted as a syllable connection (here, the combination of two syllables shall be called the "syllable connection"). Here, a syllable directly before the misrecognized syllable (preceding syllable) or a syllable directly behind the misrecognized syllable (succeeding syllable) is considered as the "syllable connected to the misrecognized syllable". In this exemplary embodiment, the syllable connected to the misrecognized syllable is assumed to be the former, namely, the preceding syllable of the misrecognized syllable.

The syllable label data 7 are the description of the syllable strings of correct answers for all training speech data (the speech data stored in the training speech data 1). By way of example, for training speech data of "kuroikuruma", a syllable string of /ku/, /ro/, /i/, /ku/, /ru/, /ma/ is described as correct answer data.

Here, assuming by way of example that the result of the preliminary experiment for the training speech data of "kuroikuruma" be /ku/, /to/, /i/, /ku/, /u/, /ma/ as shown in FIG. 4A, the syllable string of syllable label data (correct answer data) corresponding to the result is /ku/, /ro/, /i/, /ku/, /ru/, /ma/ as shown in FIG. 4B.

Here, when both the result and the syllable string are compared, syllable parts enclosed with rectangular broken-line frames B are misrecognized as seen from FIGS. 4A and 4B. That is, the syllable part of /ro/ is misrecognized as /to/, and the syllable part of /ru/ is similarly misrecognized as /u/. Accordingly, the two syllables which are the combination between the correct answer syllable for each of the misrecognized syllables and the syllable connected to the misrecognized syllable (preceding syllable) are extracted as the syllable connection.

Specifically, in the example of FIGS. 4A and 4B, at each of parts /kuro/ and /kuru/ enclosed with elliptical frames C, the two syllables, which are the combination between the correct answer syllable for the misrecognized syllable and the preceding syllable connected to the misrecognized syllable, are extracted as the syllable connection.

Each of the parts /kuro/ and /kuru/ is a syllable connection in which two syllables are connected. The syllable HMM of /kuro/ is the combination of the two syllable HMMs of a syllable HMM corresponding to the syllable of /ku/ and a syllable HMM corresponding to the syllable of /ro/. On the other hand, the syllable HMM of /kuru/ is the combination of the two syllable HMMs of the syllable HMM corresponding to the syllable of /ku/ and a syllable HMM corresponding to the syllable of /ru/. The 2-syllable HMM in which the two syllable HMMs are connected in this manner, shall be called a "syllable-connected HMM" here.

In this way, misrecognized syllabic parts are checked for all the preliminary experiment results 11, two syllables which are the combination between a correct answer syllable for any misrecognized syllable and a preceding syllable connected to the misrecognized syllable are extracted as each syllable connection, syllable-connected HMMs corresponding to all extracted syllable connections are made candidates which are to be added into the phoneme-connected syllable HMM set 9. Each of the syllable-connected HMMs being the candidates for addition and the syllable connection thereof are subjected to a preliminary experiment, so as to count the number of times of misrecognition, and the number of times of misrecognition is held.

Figures 4, 5:
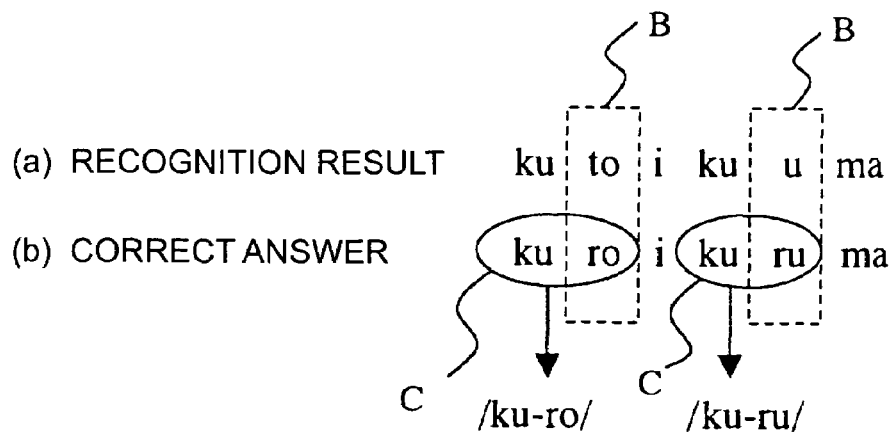
FIG. 5 is a schematic showing examples of the syllable connections extracted by the processing in FIGS. 4A and 4B and the numbers of times of misrecognition.

FIG. 5 shows an example of such processing, and lists the count results of the numbers of times of misrecognition for several syllable connections. This figure also contains some syllable connections determined to be misrecognized, by pattern matching with syllable label data which is different than the above syllable label data in FIG. 4.

In the example of FIG. 5, the number of times of misrecognition is counted for every syllable connection corresponding to each syllable-connected HMM which becomes a candidate for addition, in such a manner that the number of times of misrecognition for a syllable connection based on the combination between /ku/ and /ra/ (in the ensuing description, the syllable connection based on the combination of the two syllables shall be expressed as /ku-ra/) is 134, that the number of times of misrecognition for the syllable connection of /ku-ru/ is 189, that the number of times of misrecognition for the syllable connection of /ku-re/ is 75, that the number of times of misrecognition for the syllable connection of /ku-ro/ is 165, that the number of times of misrecognition for the syllable connection of /ro-i/ is 286, or that the number of times of misrecognition for the syllable connection of /i-ku/ is 241.

In saving the syllable connections and the numbers of times of misrecognition for the syllable connections, the syllable connections may well be sorted in accordance with the numbers of times of misrecognition so as to be arrayed in the order of larger numbers of times of misrecognition.

Among the syllable connections and the corresponding numbers of times of misrecognition, as shown in FIG. 5, any syllable connection whose number of times of misrecognition is at least N (N=100 is assumed in this exemplary embodiment) is first searched for. As to the syllable connection whose number of times of misrecognition is at least 100, the number of times which the syllable connection occurs in all the syllable label data 7 corresponding to all the training speech data 1 is subsequently counted.

When any syllable connection, whose number of times of misrecognition is at least 100, is searched for on the basis of the relationship between the syllable connections and the corresponding numbers of times of misrecognition, as shown in FIG. 5, the syllable connections of /ku-ra/, /ku-ru/, /ku-ro/, /ro-i/ and /i-ku/ are pertinent in this case, except the syllable connection of /ku-re/ whose number of times of misrecognition is 75 and is smaller than 100. In the example of FIG. 5, accordingly, respective syllable-connected HMMs corresponding to these syllable connections of /ku-ra/, /ku-ru/, /ku-ro/, /ro-i/ and /i-ku/ become the syllable-connected HMMs of the candidates for addition.

Subsequently, as to each of the syllable connections of /ku-ra/, /ku-ru/, /ku-ro/, /ro-i/ and /i-ku/, the number of times which the syllable connection occurs in all the syllable label data 7 corresponding to all the training speech data 1 is counted. The number of times may be searched for from among the syllable label data 7. Examples of search results are shown in FIG. 6.

Referring to FIG. 6, the number of times which the syllable connection of /ku-ra/ occurs in all the syllable label data 7 is 185, the number of times for the syllable connection of /ku-ru/ is 234, the number of times for the syllable connection of /ku-ro/ is 215, the number of times for the syllable connection of /ro-i/ is 305, and the number of times for the syllable connection of /i-ku/ is 276. Incidentally, the examples of the syllable connections shown in FIGS. 5 and 6 are a mere fraction of the syllable connections.

Regarding the numbers of times of occurrence as shown in FIG. 6, the syllable-connected HMM corresponding to any syllable connection whose number of times of occurrence is at most M (M=200 is assumed here) is excluded from the candidates for the addition. In the example of FIG. 6, the number of times of occurrence for the syllable connection of /ku-ra/ is 185 and is smaller than 200, so that the syllable-connected HMM corresponding to the syllable connection is excluded from the candidates for addition.

Accordingly, insofar as the contents shown in FIG. 6 are concerned, the syllable-connected HMM corresponding to the syllable connection of /ku-ru/, the syllable-connected HMM corresponding to the syllable connection of /ku-ro/, the syllable-connected HMM corresponding to the syllable connection of /ro-i/, and the syllable-connected HMM corresponding to the syllable connection of /i-ku/ become the syllable-connected HMMs which are to be added into the phoneme-connected syllable HMM set 9.

In this manner, at the first stage, syllable connections whose numbers of times of misrecognition are at least N (N=100 holds here) are extracted, and at the second stage, as to the syllable connections whose numbers of times of misrecognition are at least N, HMMs corresponding to the syllable connections whose numbers of times of occurrence in all the syllable label data 7 are at most M are excluded from the candidates, whereupon syllable-connected HMMs corresponding to remaining syllable connections are made candidates which are to be added into the phoneme-connected syllable HMM set 9.

Thus, insofar as this example is concerned, the syllable-connected HMM corresponding to the syllable connection of /ku-ru/, the syllable-connected HMM corresponding to the syllable connection of /ku-ro/, the syllable-connected HMM corresponding to the syllable connection of /ro-i/, and the syllable-connected HMM corresponding to the syllable connection of /i-ku/, become the syllable-connected HMMs which are to be added into the phoneme-connected syllable HMM set 9. As shown in FIG. 7, accordingly, an addition candidate syllable-connected HMM list 13 is generated in which the respective syllable connections corresponding to the syllable-connected HMMs to be added into the phoneme-connected syllable HMM set 9, and their numbers of times of misrecognition are described. Incidentally, the data shown in FIG. 7 are such that the respective syllable connections are sorted in accordance with the numbers of times of misrecognition, and that they are arrayed in the order of larger numbers of times of misrecognition.

Besides, as shown in FIG. 1, the data in FIG. 7 are delivered to a syllable label data correction unit 14 and an initial phoneme-connected syllable HMM/syllable-connected HMM set generation unit 15. Incidentally, the word "initial" in the initial phoneme-connected syllable HMM/syllable-connected HMM set generation unit 15 refers to HMMs before being trained, as in the foregoing.

The syllable label data correction unit 14 corrects the syllable label data of the syllable label data 7 (as to the separations of syllables) by using the data shown in FIG. 7. Such syllable label data correction processing will be described by taking syllable label data /ku/ /ro/ /i/ /ku/ /ru/ /ma/ corresponding to the training speech data of "kuroikuruma", as an example here.

In a case where the syllable connections, corresponding to the syllable-connected HMMs made candidates for addition into the phoneme-connected syllable HMM set 9, are applied to such syllable label data, a plurality of candidates sometimes overlap. That is, when the syllable connections, as shown in FIG. 7 by way of example, are to be applied to the syllable label data of /ku/ /ro/ /i/ /ku/ /ru/ /ma/, some of the syllable connections overlap, as shown in FIGS. 8A-8E.

Specifically, when the syllable connections shown in FIG. 7 are to be applied to the syllable label data of /ku/ /ro/ /i/ /ku/ /ru/ /ma/ shown in FIG. 8A, it is seen that the syllable connection /ku-ro/ shown in FIG. 8B, the syllable connection /ro-i/ shown in FIG. 8C, the syllable connection /i-ku/ shown in FIG. 8D, and the syllable connection /ku-ru/ shown in FIG. 8E are applicable. In this case, as syllables, /ro/ in /ku-ro/ and /ro/ in /ro-i/ are repeated, /i/ in /ro-i/ and /i/ in /i-ku/ are repeated, and /ku/ in /i-ku/ and /ku/ in /ku-ru/ are repeated.

In such a case where syllable connections overlap in applying them to certain syllable label data, the syllable connections whose numbers of times of misrecognition are larger are preferentially applied.

The processing will be described with reference to FIGS. 9A-9D.

In this example, the syllable connections of /ku-ro/, /ro-i/, /i-ku/ and /ku-ru/ are applicable to the syllable label data of /ku/ /ro/ /i/ /ku/ /ru/ /ma/ shown in FIG. 9A. Among these syllable connections, the syllable connection of /ro-i/, whose number of times of misrecognition is the largest (the number of times of misrecognition is 286 and is the largest in view of FIG. 7), is first applied. Thus, at this stage, as shown in FIG. 9B, the syllable label data have /ro/ and /i/ connected and are substituted as /ku/ /ro-i/ /ku/ /ru/ /ma/.

Subsequently, the syllable connection is applied to the syllable label data in FIG. 9B. On this occasion, the syllable label data shall not be substitutable by combining adjacent ones of syllables after the substitution. More specifically, although the syllable connection to be applied next is the syllable connection of /i-ku/, which is larger in the number of times of misrecognition next to the syllable connection of /ro-i/, this syllable connection of /i-ku/ cannot be applied because the syllable label data shall not be substitutable by combining the adjacent ones of syllables after the substitution. Therefore, the syllable connection of /ku-ru/, which is larger in the number of times of misrecognition next, is applied. Thus, at this stage, the syllable label data is substituted as /ku/ /ro-i/ /ku-ru/ /ma/ as shown in FIG. 9C.

Subsequently, the syllable connection is applied to the syllable label data in FIG. 9C. Here, although the syllable connection to be applied is the syllable chain of /ku-ro/, this syllable connection of /ku-ro/ cannot be applied in this case, either, because the syllable label data shall not be substitutable by combining the adjacent ones of syllables after the substitution. Accordingly, the processing is ended here. After all, corrected syllable label data as shown in FIG. 9D, are obtained as a corrected result, and they become /ku/ /ro-i/ /ku-ru/ /ma/.

Such processing is executed for all the syllable label data 7, and results are saved as corrected syllable label data 16 (refer to FIG. 1) for the respective syllable label data.

In the above way, the correction processing of the syllable label data using the addition candidate syllable-connected HMM list 13 (refer to FIG. 7) is ended. The data of the addition candidate syllable-connected HMM list 13 (refer to FIG. 7) are also afforded to the initial phoneme-connected syllable HMM/syllable-connected HMM set generation unit 15, and syllable-connected HMMs generated anew (syllable-connected HMMs corresponding to the syllable connections shown in FIG. 7) are added to the respective phoneme-connected syllable HMMs saved in the phoneme-connected syllable HMM set 9 (each individual phoneme-connected syllable HMM is formed of the combination of two phoneme HMMs), whereby an initial phoneme-connected syllable HMM/syllable-connected HMM set 17 is generated. On this occasion, when the same phoneme HMM is tied, distribution tying is done in the respective states of the tied phoneme HMM, as in the foregoing case where the initial phoneme-connected syllable HMM set 6 is generated by the initial phoneme-connected syllable HMM set generation unit 5. Examples of the distribution tying are shown in FIGS. 10A and 10B.

Figure 10:
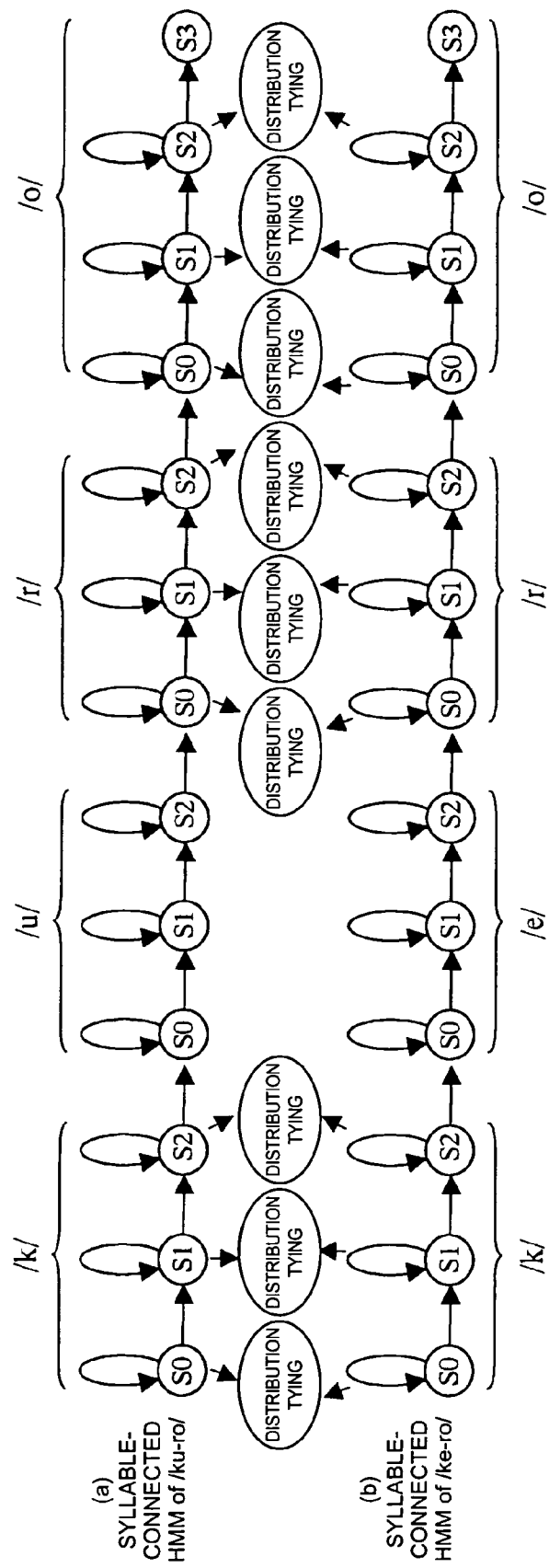
FIGS. 10A and 10B are schematics, each showing an example of a syllable-connected HMM which is added into a phoneme-connected syllable HMM set.

FIGS. 10A and 10B show a syllable-connected HMM corresponding to the syllable connection of /ku-ro/, and a syllable-connected HMM corresponding to the syllable connection of /ke-ro/, as the examples of the syllable-connected HMMs added anew. The syllable-connected HMM corresponding to the syllable connection of /ku-ro/ as shown in FIG. 10A, is such that a syllable HMM corresponding to the syllable of /ku/ and a syllable HMM corresponding to the syllable of /ro/ are connected. Further, the syllable HMM corresponding to the syllable of /ku/is such that phoneme HMMs corresponding to the respective phonemes of /k/ and /u/ are connected, while the syllable HMM corresponding to the syllable of /ro/ is such that phoneme HMMs corresponding to the respective phonemes of /r/ and /o/ are connected. Likewise, the syllable-connected HMM corresponding to the syllable connection of /ke-ro/ as shown in FIG. 10B, is such that a syllablec HMM corresponding to the syllable of /ke/ and the syllablec HMM corresponding to the syllable of /ro/ are connected. Further, the syllable HMM corresponding to the syllable of /ke/ is such that phoneme HMMs corresponding to the respective phonemes of /k/ and /e/ are connected, while the syllabic HMM corresponding to the syllable of /ro/ is such that the phoneme HMMs corresponding to the respective phonemes of /r/ and /o/ are connected.

Such syllable-connected HMMs respectively corresponding to the syllable connection of /ku-ro/ and the syllable connection of /ke-ro/ can tie the phoneme HMMs corresponding to the phonemes of /k/, /r/ and /o/, as the HMMs of the same phonemes. Therefore, the sharable phoneme HMMs are brought into distribution tying in the respective states thereof.

Besides, as to the initial phoneme-connected syllable HMM/syllable-connected HMM set 17 thus generated, an HMM retraining unit 18 retrains on the basis of the maximum likelihood method by using the training speech data 1 and the corrected syllable label data 16. Among parameters, such as an average value, variance and weight, in the respective states of each tied phoneme HMM, the weight changes to values corresponding to the respective phoneme-connected syllable HMMs obtained by the HMM retraining of the HMM retraining unit 18. Accordingly, even the syllable-connected HMMs corresponding to the syllable connection chain of /ku-ro/ and the syllable connection of /ke-ro/ employ the phoneme HMMs corresponding to the common phonemes of /k/, /r/ and /o/, as shown in FIGS. 10A and 10B by way of example, become the syllable-connected HMMs in which coarticulation is considered, respectively.

In this way, a trained phoneme-connected syllable HMM/syllable-connected HMM set 19 is created which is obtained by retraining the individual phoneme-connected syllable HMMs/syllable-connected HMMs that exist in the initial phoneme-connected syllable HMM/syllable-connected HMM set 17. The phoneme-connected syllable HMM/syllable-connected HMM set 19 is the final acoustic model which is to be acquired in this exemplary embodiment, and a higher recognition rate can be attained by implementing speech recognition using this phoneme-connected syllable HMM/syllable-connected HMM set 19 as the acoustic model.

In the above exemplary embodiment, in extracting misrecognized syllabic parts with the preliminary experiment results 11 and then generating the addition candidate syllable-connected HMM list 13 on the basis of the misrecognized syllabic parts, the procedure of two stages is taken in such a manner that, at the first stage, syllable connections whose numbers of times of misrecognition are at least N (here, N=100) are extracted. At the second stage, as to the syllable connections whose numbers of times of misrecognition are at least N, syllable connections whose numbers of times of occurrence in all the syllable label data 7 corresponding to all the training speech data 1 are at most M are excluded as candidates. Whereupon syllable-connected HMMs corresponding to remaining syllable connections are made candidates which are to be added into the phoneme-connected syllable HMM set 9. After the processing of the two stages has been executed, the remaining syllable connections are saved in the addition candidate syllable-connected HMM list 13 as addition candidate syllable connections. However, addition candidate syllable connections may well be acquired by only the processing of the first stage without executing the processing of the second stage. A high recognition rate can be attained even in this way. When the processing up to the second stage is executed, the number of syllable connections to be added can be made smaller, the general amount of data can be decreased still further, and a higher recognition rate can be attained in implementing practical recognition.

Alternatively, the individual phoneme-connected syllable HMMs, saved in the phoneme-connected syllable HMM set 9, may well be subjected to optimization processing for distribution numbers by using the MDL (Minimum Description Length) criterion, whereupon a phoneme-connected syllable HMM set which includes phoneme-connected syllable HMMs after the optimization processing for the distribution numbers is delivered to the preliminary experiment unit 10 and the initial phoneme-connected syllable HMM/syllable-connected HMM set generation unit 15. Shown in FIG. 11 is the block schematic of a construction in which the optimization processing for the distribution numbers as uses the MDL criterion is added.

Figure 11:
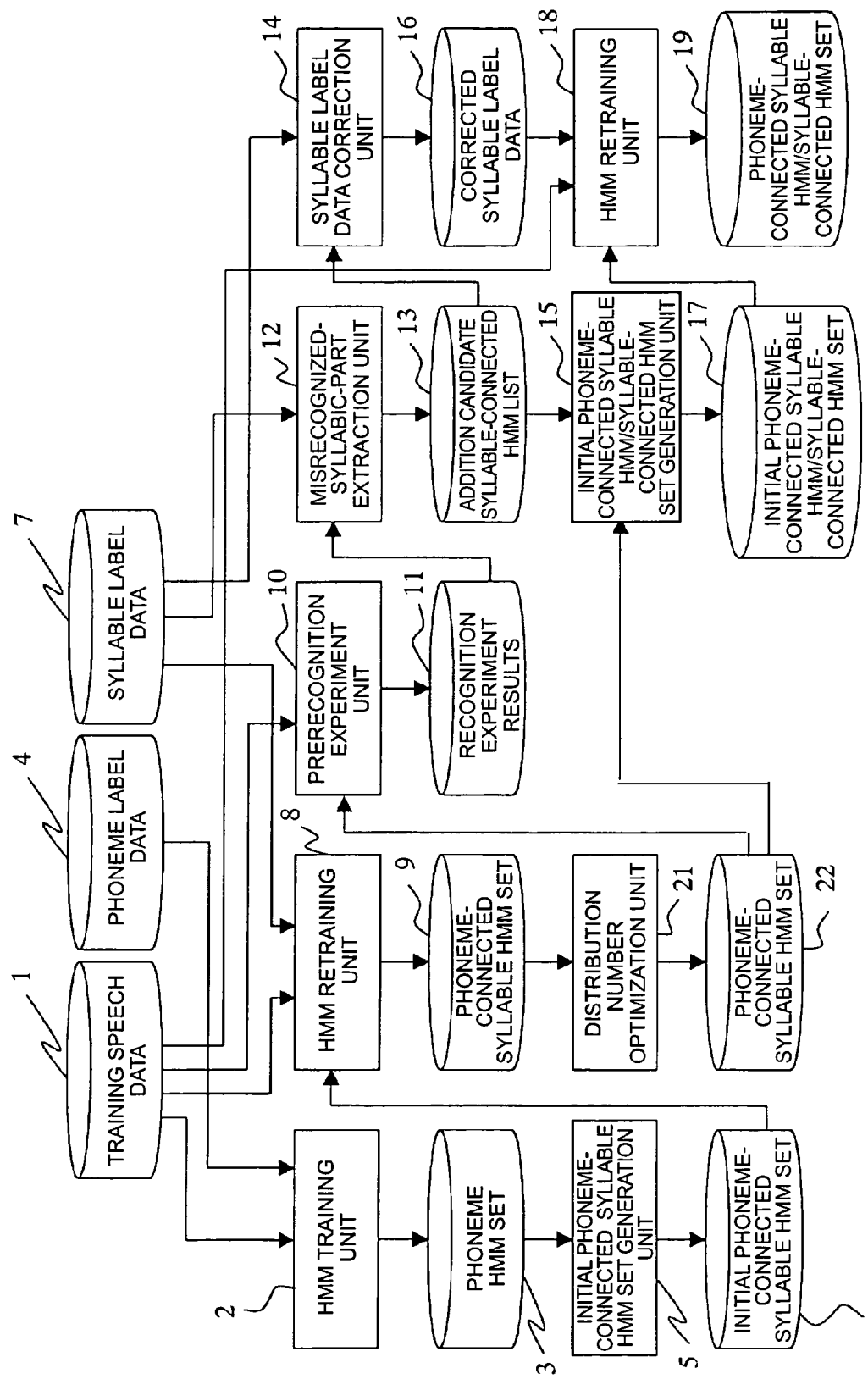
FIG. 11 is a block schematic of a construction in which optimization processing for distribution numbers as uses the MDL criterion is added to the construction in FIG. 1.

The construction in FIG. 11 differs from the construction in FIG. 1 in only the point that a distribution number optimization unit 21 which executes the optimization processing for the distribution numbers by using the MDL criterion is disposed on the output side of the phoneme-connected syllable HMM set 9, and by which a phoneme-connected syllable HMM set 22 with the distribution numbers optimized is created, so as to deliver the phoneme-connected syllable HMM set 22 to the preliminary experiment unit 10 and the initial phoneme-connected syllable HMM/syllable-connected HMM set generation unit 15. Since the others are the same as in FIG. 1, they shall be omitted from description by assigning the same reference numerals to the same constituents.

In brief, with the distribution number optimization unit 21, the number of Gaussian distributions is set at a plurality of distribution numbers from a certain value to the maximum distribution number for each of a plurality of states constituting an HMM. Description lengths are calculated by using the MDL criterion, for the respective Gaussian distribution numbers as to each state set at the plurality of Gaussian distribution numbers. A state which has the Gaussian distribution number minimizing the description length is selected for each state. The HMM is constructed of such states which have the Gaussian distribution numbers minimizing the description lengths and which have been selected for the respective states, and the constructed HMM is retrained using the training speech data 1. Thus, the phoneme-connected syllable HMM set 22 is generated which includes phoneme-connected syllable HMMs with the Gaussian distribution numbers of the individual states optimized for the respective states.

The optimization processing for the distribution numbers which uses the MDL criterion is stated in a paper by the inventors of the present invention; Kazukimi Yamamoto, Taro Ikeda, Hiroshi Matsumoto, Masanobu Nishitani, and Yasunaga Miyazawa: "AN INVESTIGATION OF COMPACT AND HIGH PERFORMANCE SYLLABLE MODELS", Papers of Fall Meeting of the Acoustic Society of Japan in 2002, Jan. 9, 1922.

The individual phoneme-connected syllable HMMs after the distribution number optimization processing by the distribution number optimization unit 21 are such that the distribution numbers of the respective states have been optimized. Therefore, the number of parameters can be sharply decreased while a satisfactory recognition performance is ensured. Accordingly, curtailment in a memory capacity to be used and curtailment in an arithmetic amount are attained, operations with a CPU of low processibility are permitted, and lower dissipation power is attained, so that the application of an aspect of the present invention to a system requiring a low price becomes possible.

Further, as indicated also in the paper mentioned above, in phoneme-connected syllable HMMs having the same consonant or the same vowel, phoneme-connected syllable HMMs which tie, for example, the initial state or the final state among a plurality of states (states having self-loops) forming the phoneme-connected syllable HMMs are constructed, whereupon the above technique to optimize distribution numbers can be applied to the phoneme-connected syllable HMMs subjected to the state tying. Owing to such state tying, the number of parameters can be decreased still further.

Besides, it is one of the features of an aspect of the present invention that a phoneme-connected syllable HMM is generated by connecting phoneme HMMs. It is also possible to use such phoneme-connected syllable HMMs (in FIG. 1, the phoneme-connected syllable HMM set 9, or in FIG. 11, the phoneme-connected syllable HMM set 22 generated by using the MDL criterion) as an acoustic model.

The phoneme-connected syllable HMM set 9 or the phoneme-connected syllable HMM set 22 can be more efficiently trained with a small number of training speech data as compared with the related-art syllable HMM set and can be therefore made to have higher performance, so that a higher recognition rate than is obtained in speech recognition using the related-art syllable HMM set is attained.

Figure 12:
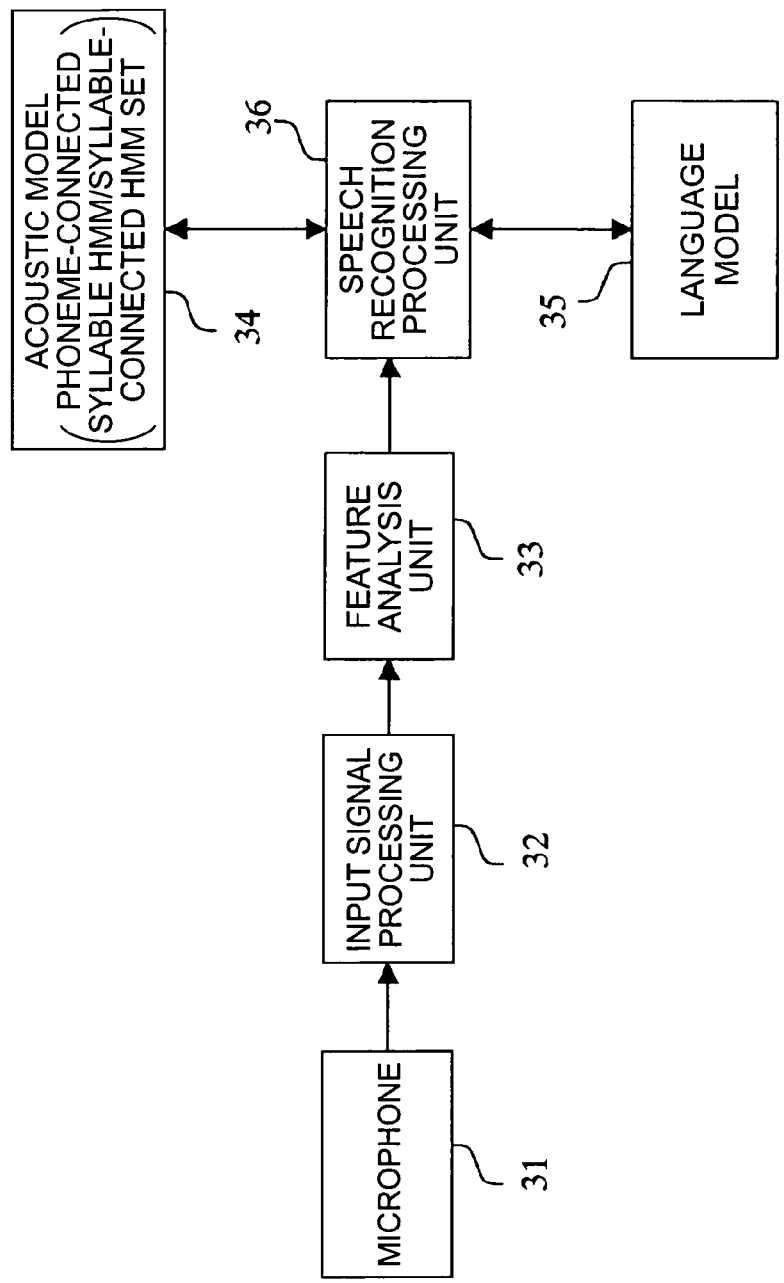
FIG. 12 is a block schematic of a speech recognition apparatus according to the present invention.

FIG. 12 is a schematic showing the construction of a speech recognition apparatus which uses an acoustic model created by the exemplary embodiment thus far described (here, the phoneme-connected syllable HMM/syllable-connected HMM set 19 in FIG. 1). The speech recognition apparatus includes a microphone 31 to input speech, an input signal processing unit 32 which amplifies the speech input from the microphone 31 and which converts the amplified speech into a digital signal, a feature analysis unit 33 which extracts feature data (a feature vector) from the digitized speech signal delivered from the input signal processing unit 32, and a speech recognition processing unit 36 which implements speech recognition for the feature data outputted from the feature analysis unit 33, by using an acoustic model 34 and a speech model 35. The phoneme-connected syllable HMM/syllable-connected HMM set 19 in FIG. 1 is employed as the acoustic model 34.

The phoneme-connected syllable HMM/syllable-connected HMM set 19 being the acoustic model 34 with which the speech recognition of the speech recognition apparatus is implemented in this manner, is obtained, in brief, in such a way that the phoneme-connected syllable HMM set 9 which includes the combinations of phoneme HMMs is constructed. That the preliminary experiment is conducted for the phoneme-connected syllable HMM set 9 so as to extract any phoneme-connected syllable HMM liable to misrecognition, that, as to the misrecognized syllabic part, the combination between a correct answer syllable for the misrecognized syllable and a syllable preceding it is extracted. That a syllable-connected HMM which corresponds to a syllable connection formed of the combination between the correct answer syllable and the preceding syllable (in consideration of the number of times of misrecognition, the number of times of occurrence, etc.) is added into the phoneme-connected syllable HMM set 9. And that the resulting phoneme-connected syllable HMM set is retrained.

Such a phoneme-connected syllable HMM/syllable-connected HMM set 19 becomes a high-accuracy acoustic model in which coarticulation is considered, not only within each syllable, but also between syllables. Therefore, the number of parameters can be decreased while high recognition performance is kept. Accordingly, curtailment in an arithmetic amount and curtailment in a memory capacity to be used are attained, and a raise in processing speed is attained. Further, since a lower price and lower dissipation power are permitted, the speech recognition apparatus becomes very useful even as one which is installed on a small-sized and inexpensive system that is subject to serious restrictions in hardware resources.

There will now be explained results obtained when speech recognition was actually implemented by using the phoneme-connected syllable HMM/syllable-connected HMM set 19 as an acoustic model.

First, although a recognition rate was 68.13% in a continuous syllable recognition experiment using the related-art syllable HMM set of 124 syllables (isolated syllables), a recognition rate of 70.42% could be attained by using a phoneme-connected syllable HMM set. Further, in a case where distribution numbers were optimized for such a phoneme-connected syllable HMM set by using the MDL criterion stated before, thereby decreasing the distribution numbers, a recognition rate of 70.65% could be attained in spite of the decreases in the distribution numbers.

A recognition rate of 72.54% could be attained in a case where the numbers of times of misrecognition as described with reference to FIG. 5 were considered (N=100 was set, and syllable connections whose numbers of times of misrecognition were at least 100 were extracted) from within a phoneme-connected syllable HMM/syllable-connected HMM set generated in accordance with the procedure as described in the foregoing exemplary embodiment and by using the phoneme-connected syllable HMM set mentioned above. Further, a recognition rate of 73.42% could be attained in a case where the numbers of times of misrecognition and the frequency of occurrence (M=200 was set, and syllable connections whose numbers of times of occurrence were at most 200 were excluded).

As understood from the experimental results, the phoneme-connected syllable HMM/syllable-connected HMM set 19 generated in accordance with an aspect of the present invention can attain a high recognition rate. A sharp enhancement in recognition performance can be expected by using this phoneme-connected syllable HMM/syllable-connected HMM set 19 as the acoustic model. As stated above, even in the case of using the phoneme-connected syllable HMMs, each of which is formed of the mere combination of two phoneme HMMs, the recognition rate can be enhanced more than in the case of using the related-art syllable HMMs of isolated syllables.

The present invention is not restricted to the foregoing exemplary embodiments. Various modifications can be made within a scope not departing from the subject matter of the present invention. By way of example, in each of the foregoing exemplary embodiments, any syllable which is liable to misrecognition as the result of the preliminary experiment is extracted, and as to the misrecognized syllabic part, the combination between a correct answer syllable for the misrecognized syllable and a syllable preceding it is extracted. However, the combination of the correct answer syllable with the preceding syllable is not restrictive. In a broader sense, the "combination" is a syllable which includes the correct answer syllable for the misrecognized syllable. The combination may well be, for example, with a succeeding syllable or with the preceding and succeeding syllables.

According to an aspect of the present invention, it is also permitted to create a processing program in which a processing procedure to carry out exemplary embodiments of the present invention is described, and to record the processing program in a record medium, such as a floppy disk, optical disk or hard disk. The present invention shall cover also the record medium in which the processing program is recorded. Moreover, the processing program may well be obtained over a network.

ADVANTAGES OF THE INVENTION

As described above, according to the acoustic model creation method and acoustic model creation apparatus of an aspect of the present invention, it is permitted to generate phoneme-connected syllable HMMs by combining phoneme HMMs, and to use the phoneme-connected syllable HMMs as syllable HMMs corresponding to individual syllables. Owing to such generation of the phoneme-connected syllable HMMs (syllable HMMs) by combining the phoneme HMMs, the phoneme-connected syllable HMMs can be more efficiently trained with a small number of training speech data, and they can therefore be made HMMs of higher performance.

In the acoustic model generation method and acoustic model creation apparatus of an aspect of the present invention, a phoneme-connected syllable HMM/syllable-connected HMM set is further generated in such a way that a recognition experiment is conducted using a phoneme-connected syllable HMM set which includes phoneme-connected syllable HMMs formed of the combinations of phoneme HMMs, that, on the basis of the results of the experiment and as to any syllabic part liable to misrecognition, the combination between a correct answer syllable for the misrecognized syllable and a syllable connected to the misrecognized syllable is extracted as a syllable connection. And that a syllable-connected HMM corresponding to the syllable connections is added into the above phoneme-connected syllable HMM set. Therefore, the phoneme-connected syllable HMM set in which coarticulation is considered, not only within each syllable, but also between syllables can be generated, and a high recognition rate can be attained by using this phoneme-connected syllable HMM/syllable-connected HMM set as an acoustic model.

The number of times of misrecognition of each syllable connection is counted using the recognition experiment result, and any syllable-connected HMM, corresponding to the syllable connection whose number of times of misrecognition is at least a preset number, is made a candidate for addition into the above phoneme-connected syllable HMM set. Therefore, only syllable-connected HMMs which are effective in practical recognition can be efficiently extracted without indiscriminately increasing syllable-connected HMMs which are to be added to the phoneme-connected syllable HMMs. Further, besides the number of times of misrecognition, the number of times which the syllable connection occurs in syllable label data corresponding to the above training speech data is counted, and any syllable-connected HMM corresponding to the syllable connection whose number of times of occurrence in the training speech data, among such syllable connections whose numbers of times of misrecognition are at least the preset number, is at most a preset number, is excluded from the candidates for addition into the above phoneme-connected syllable HMM set. Therefore, the syllable-connected HMMs which are effective for the practical recognition can be extracted in a smaller number.

On condition that, in a case where the syllable connection corresponding to the syllable-connected HMM made the candidate for the addition into the phoneme-connected syllable HMM set is applied to the syllable label data, a plurality of syllable connections are repeatedly applicable. The syllable connection whose number of times of misrecognition is larger is preferentially applied. And the syllabic separation of the corresponding syllable label data is corrected. In this manner, the corrections of the syllable label data are made by preferentially applying the syllable connections whose numbers of times of misrecognition are larger. Therefore, when the initial phoneme-connected syllable HMM/syllable-connected HMM set is trained using the training speech data and the corrected syllable label data, a phoneme-connected syllable HMM/syllable-connected HMM set of higher accuracy can be generated.

On condition that, in the training of HMMs as proceeded in generating the phoneme-connected syllable HMM set and in the training of HMMs as proceeded in generating the phoneme-connected syllable HMM/syllable-connected HMM set, any common phoneme HMM is used. Gaussian distributions are tied in the respective states of the common phoneme HMM. Therefore, the problem of insufficient training data attributed to the longer unit of the recognition can be coped with, so that a recognition rate can be prevented from becoming lower.

A syllable connected to any misrecognized syllable is the preceding syllable of the misrecognized syllable, and the combination between this preceding syllable and a correct answer syllable for the misrecognized syllable is made the syllable connection. The combination may well be with the succeeding syllable of the misrecognized syllable. Since, however, the combination with the preceding syllable has produced a more favorable result by an experiment, a higher recognition rate will be attained in practical recognition when the syllable connection is the combination with the preceding syllable.

The speech recognition apparatus of an aspect of the present invention uses the phoneme-connected syllable HMM/syllable-connected HMM set created by the above acoustic model creation method of an aspect of the present invention. The phoneme-connected syllable HMM/syllable-connected HMM set has coarticulation considered, not only within each syllable, but also between syllables, so that a high recognition rate can be attained by using this phoneme-connected syllable HMM/syllable-connected HMM set as an acoustic model. Moreover, since syllable-connected HMMs are created for syllable connections liable to misrecognition, the scale of the acoustic model can be prevented from enlarging more than is necessary. Since the syllable-connected HMMs effective for recognition are known, a high recognition rate can be attained. Further, curtailment in an arithmetic amount and curtailment in a memory capacity to be used are permitted, thereby permitting a raised processing speed, a lower price and lower dissipation power. Thus the speech recognition apparatus becomes very useful as one which is installed on a small-sized and inexpensive system that is subject to serious restrictions in hardware resources.

What is claimed is:

1. An acoustic model creation method to create a syllabic HMM (Hidden Markov Model) which is an acoustic model, comprising:

generating a phoneme HMM set which includes phoneme HMMs corresponding to individual phonemes;

combining the phoneme HMMs of the phoneme HMM set so as to generate an initial phoneme-connected syllable HMM set which includes initial phoneme-connected syllable HMMs corresponding to individual syllables;

training the initial phoneme-connected syllable HMM set, thereby generating a phoneme-connected syllable HMM set being the acoustic model; and conducting a preliminary experiment for the phoneme-connected syllable HMM set by using training speech data, any misrecognized syllable and a syllable connected to the misrecognized syllable being checked using results of the preliminary experiment and syllable label data prepared in correspondence with the training speech data, a combination between a correct answer syllable for the misrecognized syllable and a syllable connected to the misrecognized syllable being extracted as a syllable connection, that a syllable-connected HMM corresponding to the syllable connection being added into the phoneme-connected syllable HMM set so as to generate an initial phoneme-connected syllable HMM/syllable-connected HMM set, and then the initial phoneme-connected syllable HMM/syllable-connected HMM set being trained using the training speech data and the syllable label data, thereby generating a phoneme-connected syllable HMM/syllable-connected HMM set being the acoustic model, the numbers of times of misrecognition of such syllable connections in the preliminary experiment results being counted, and that, a syllable-connected HMM corresponding to any syllable connection whose number of times of misrecognition is at least a preset number, among the syllable connections extracted using the preliminary experiment results, is made a candidate for addition into the phoneme-connected syllable HMM set.

2. The acoustic model creation method as recited in claim 1, the number of times which such syllable connections occur in syllable label data corresponding to the training speech data being counted in addition to the numbers of times of misrecognition, and a syllable-connected HMM corresponding to any syllable connection whose number of times of occurrence in syllable label data corresponding to the training speech data is at most a preset number, among the syllable connections whose numbers of times of misrecognition are at least the preset number, being excluded as the candidate for the addition into the phoneme-connected syllable HMM set.

3. The acoustic model creation method as recited in claim 1, the syllable label data being corrected using any syllable connection which corresponds to the syllable-connected HMM made a candidate for addition into the phoneme-connected syllable HMM set, and subject to a plurality of syllable connections repeatedly applicable in a case where the syllable connection corresponding to the syllable-connected HMM made a candidate for addition into the phoneme-connected syllable HMM set is applied to the syllable label data, the syllable connection whose number of times of misrecognition is larger being preferentially applied so as to correct the corresponding syllable label data.

4. The acoustic model creation method as recited in claim 1, in a case where any common phoneme HMM is used in the training of initial phoneme-connected syllable HMMs as proceeded in generating the phoneme-connected syllable HMM set and in the training of initial phoneme-connected syllable HMMs/syllable-connected HMMs as proceeded in generating the phoneme-connected syllable HMM/syllable-connected HMM set, Gaussian distributions being tied in respective states of the common phoneme HMM.

5. The acoustic model creation method as recited in claim 1, the syllable connected to any misrecognized syllable being a preceding syllable of the misrecognized syllable, and a combination between the preceding syllable and a correct answer syllable for the misrecognized syllable being extracted as the syllable connection.

6. The acoustic model creation method as recited in claim 1, distribution number optimization processing using a Minimum Description Length criterion being executed for the phoneme-connected syllable HMM set, thereby generating a phoneme-connected syllable HMM set whose distribution numbers are optimized, and which is used in subsequent processing.

7. An acoustic model creation apparatus to create a syllable HMM (Hidden Markov Model) which is an acoustic model, comprising:

an initial phoneme-connected syllable HMM set generation device to combine phoneme HMMs trained in correspondence with individual phonemes, so as to generate an initial phoneme-connected syllable HMM set which includes initial phoneme-connected syllable HMM corresponding to individual syllables; and a HMM retraining device to retrain the initial phoneme-connected syllable HMM set so as to generate a phoneme-connected syllable HMM set being the acoustic model;

a preliminary experiment device to conduct a preliminary experiment which uses training speech data, for a phoneme-connected syllable HMM set;

a misrecognized-syllabic-part extraction device to check any misrecognized syllable and a syllable connected to the misrecognized syllable by using results of the preliminary experiment obtained by the preliminary experiment device and syllable label data prepared in correspondence with the training speech data, and to extract as a syllable connection, a combination between a correct answer syllable for the misrecognized syllable and a syllable connected to the misrecognized syllable;

initial phoneme-connected syllable HMM/syllable-connected HMM set generation device to add a syllable-connected HMM which corresponds to the syllable connection extracted by the misrecognized-syllabic-part extraction device, into the phoneme-connected syllable HMM set, thereby generating an initial phoneme-connected syllable HMM/syllable-connected HMM set;

the HMM retraining device to retrain the initial phoneme-connected syllable HMM/syllable-connected HMM set generated by the initial phoneme-connected syllable HMM/syllable-connected HMM set generation device, by using the training speech data and the syllable label data, thereby generating a phoneme-connected syllable HMM syllable-connected HMM set being the acoustic model; and characterized in that the misrecognized-syllabic-part extraction device counts the numbers of times of misrecognition of the syllable connections in the preliminary experiment results, and that, a syllable-connected HMM corresponding to any syllable connection whose number of times of misrecognition is at least a preset number, among the syllable connections extracted using the preliminary experiment results, is made a candidate for addition into the phoneme-connected syllable HMM set.

8. The acoustic model creation apparatus as recited in claim 7, the numbers of times which such syllable connections occur in syllable label data corresponding to the training speech data being counted in addition to the numbers of times of misrecognition, and that a syllable-connected HMM corresponding to any syllable connection whose number of times of occurrence in syllable label data corresponding to the training speech data is at most a preset number, among the syllable connections whose numbers of times of misrecognition are at least the preset number, being excluded as a candidate for addition into the phoneme-connected syllable HMM set.

9. The acoustic model creation apparatus as recited in claim 7, a syllable label data correction device to correct the syllable label data being provided, the syllable label data correction device correcting the syllable label data by using any syllable connection which corresponds to the syllable-connected HMM made a candidate for addition into the phoneme-connected syllable HMM set, and that, subject to a plurality of syllable connections repeatedly applicable in a case where the syllable connection corresponding to the syllable-connected HMM made a candidate for addition into the phoneme-connected syllable HMM set being applied to the syllable label data, the syllable connection whose number of times of misrecognition is larger being preferentially applied so as to correct the corresponding syllable label data.

10. The acoustic model creation apparatus as recited in claim 7, in a case where any common phoneme HMM is used in the training of initial phoneme-connected syllable HMMs as proceeded in generating the phoneme-connected syllable HMM set and in the training of initial phoneme-connected syllable HMMs/syllable-connected HMMs as proceeded in generating the phoneme-connected syllable HMM/syllable-connected HMM set, Gaussian distributions being tied in respective states of the common phoneme HMM.

11. The acoustic model creation apparatus as recited in claim 7, the syllable connected to any misrecognized syllable is a preceding syllable of the misrecognized syllable, and a combination between the preceding syllable and a correct answer syllable for the misrecognized syllable being extracted as the syllable connection.

12. The acoustic model creation apparatus as recited in claim 7, a distribution number optimization device to subject the phoneme-connected syllable HMM set to distribution number optimization processing using a Minimum Description Length criterion being provided and a phoneme-connected syllable HMM set whose distribution numbers are optimized being generated by the distribution number optimization device and being used in subsequent processing.

13. A speech recognition apparatus to recognize input speech by employing an HMM (Hidden Markov Model) which is an acoustic model, for feature data obtained by subjecting the input speech to a feature analysis, characterized in that any acoustic model created by the acoustic model creation method as recited in claim 3 is used as the HMM being the acoustic model.

14. A speech recognition apparatus to recognize input speech by employing an HMM (Hidden Markov Model) which is an acoustic model, for feature data obtained by subjecting the input speech to a feature analysis, characterized in that any acoustic model created by the acoustic model creation apparatus as recited in claim 7 is used as the HMM being the acoustic model.

* * * * *